Patented Aug. 13, 1935

2,011,302

UNITED STATES PATENT OFFICE 2,011,302

PREPARATION OF XANTHATES

Ludwig Rosenstein, San Francisco, Calif., assignor to Shell Development Company, San Francisco, Calif., a corporation of Delaware No Drawing. Application May 22, 1934, Serial No. 726,898

14 Claims. (Cl. 260—99.11)

This invention relates to a simple, flexible and economical method for the preparation of anhydrous alkali metal xanthates containing a minimum of undesirable impurities such as metal thiocarbonates and sulphides.

The prior art describes a wide variety of methods for the production of xanthates, particularly the alkali metal and ammonium xanthates. In accordance with the known methods, xanthates may be prepared by reacting carbon disulphide with an alkali metal alcoholate, or by bringing together and effecting the reaction of carbon disulphide, alcohol and an alkali metal- or ammonium hydroxide.

Anhydrous, substantially pure, alkali metal xanthates can be prepared by reacting an anhydrous alkali metal alcoholate with carbon disulphide; however, this method is in general impractical and uneconomical due to the high cost of the reactants necessitated and the difficulties experienced in the preparation of the required anhydrous alcoholates.

The better known and more generally used methods employed for the preparation of alkali metal xanthates comprise effecting the direct reaction of carbon disulphide, alcohol and an alkali metal hydroxide whereby the alkali metal xanthate and an equimolecular quantity of water are formed. With few exceptions, these processes are executed in the presence of varying amounts of water. The water may be initially present due to its introduction with the reactants, or anhydrous reactants may be used in which cases the only water present is that formed in the course of the reaction.

I have found that when xanthates are formed in the presence of water, the water favors the occurrence of undesirable side reactions resulting in the formation of thiocarbonates, sulphides and the like compounds which contaminate the xanthate product and materially reduce its value. In some cases, the purity of the xanthate is reduced to such an extent that it may be rendered unsuitable for many industrial purposes. Not only is the presence of these impurities undesirable from the standpoint of utility of the product; but their formation also lowers the yield of xanthate obtainable from the raw materials consumed. It is also known that their presence has a deleterious effect on the stability of the xanthate.

My invention provides a general method for the production of alkali metal xanthates and comprises reacting carbon disulphide with a preferably substantially anhydrous solution or suspension of an alkali metal hydroxide in an excess of an organic hydroxy compound, under such conditions that water introduced with the reactants and/or formed during the course of the reaction is continuously removed from the reaction system by maintaining the reaction system at such a temperature and pressure that water is distilled therefrom, preferably as a minimum boiling azeotrope with the organic hydroxy compound. In those cases where azeotropes do not form, the operating temperatures and pressures will be those at which the organic hydroxy compound and/or water may be distilled from the system in accordance with their vapor pressure relations at the operating temperature. This mode of water removal is effected during the course of the reaction.

The basic metal compound may be employed as a solution or suspension in the organic hydroxy compound. In accordance with the present invention, I prefer to employ substantially anhydrous solutions or suspensions of the basic compound in the hydroxy compound. When a basic compound such as a metal hydroxide is dissolved or suspended in an alcohol, some water may exist in the solution or suspension due to the reaction of the metal hydroxide with the alcohol to form the metal alcoholate and water. The amount of water thus formed will depend on the solubility of and the nature of the basic compound employed. If the water is present in an amount sufficient to render the process inefficient, it may be removed by any suitable means prior to, during, or after, the introduction of the solution or suspension to the reaction vessel. In general my process is efficient if the water present is not in an amount in excess of that which can be removed from the reaction system by distillation before the reaction has proceeded to any considerable extent; it being preferable that the reaction mixture be substantially anhydrous or contains a relatively low percentage of water which can be readily removed by distillation. The basic compound is dissolved or suspended in an amount of the organic hydroxy compound in preferably substantial molecular excess over the basic compound. The magnitude of this excess will depend on the particular reactants employed and the operating conditions and may vary within wide limits depending on the particular taste of the operator. If the water is distilled from the system as a constant boiling mixture with the organic hydroxy compound, the excess of the latter employed will depend, to a certain extent, on the composition of the minimum constant boiling mixture.

Monohydric alcohols as ethyl, propyl, isopropyl, butyl, isobutyl, secondary butyl, primary normal and isoamyl, the isomeric secondary amyl alcohols as well as their higher homologues may be used. Polyhydric alcohols as ethylene glycol, the propylene, butylene and amylene glycols, glycerol and its homologues, the polyglycols, etc. may be reacted. Where these polyhydric alcohols are used, one or more of the hydroxyl groups may be taken up by ether and/or ester groups provided at least one hydroxyl group is available for reaction purposes. It is to be noted that primary, and secondary carbinol groups may be present in any of the available organic hydroxy compounds.

In addition to saturated alcohols as the above, unsaturated alcohols as allyl, crotyl, methyl allyl, propargyl, cinnamyl, the primary and secondary butenols, pentenols, etc. as well as the terpineols may be used. It is seen from the above that cyclic alcohols may be employed. Such cyclic alcohols include, in addition to those listed, compounds such as benzyl alcohol, phenyl propyl alcohols, cyclohexanol, furfuryl alcohol and the like.

The carbon disulphide employed is preferably introduced below the surface of the solution or suspension of the basic metal compound in the alcohol contained in the reaction vessel. Its mode of introduction and the zone or zones of the reaction vessel into which it is introduced will depend on the rate of reaction of the reactants in the reaction vessel, the conditions of temperature and pressure in the system, as well as on its rate of introduction. In general, I prefer to introduce a slight molecular excess of carbon disulphide over the amount of the initial basic compound in the reaction mixture. This excess is largely to compensate for slight losses which may be experienced due to vaporization of the carbon disulphide on passage into the reaction mixture. Due to the relatively rapid rate of the reaction, these losses are, in the majority of cases, insignificant.

In those cases where carbon disulphide is soluble, it may be desirable to introduce the carbon disulphide as a solution with the hydroxy compound to be reacted. By this mode of introduction, handling losses may be reduced and the amount of the hydroxy compound may be kept substantially constant in the reaction vessel by regulating the relative concentrations of the admitted solution so that the alcohol is introduced at substantially the same rate at which it is reacted and may be removed from the reaction system. When an excess of carbon disulphide is present, the water may be distilled off as a minimum constant boiling mixture with said excess with or without alcohol.

For purposes of illustration, the mode of execution of my invention as applied to the production of anhydrous alkali metal xanthates will be discussed in some detail.

The reaction is conveniently effected in a suitable reaction vessel in communication with a suitable distilling or fractionating apparatus in such a manner that vapors from the former may be conducted directly into the latter. The reaction vessel is preferably provided with heating means and means for effecting agitation of its contents.

I may execute my invention as follows: The desired alkali metal hydroxide is first suspended or dissolved in an excess of the, preferably, anhydrous alcohol to be reacted. This solution or suspension may be effected prior to, during, or after the introduction of the reactants to the reaction vessel. If water is present in substantial amount in the solution or suspension it may be removed therefrom, in many cases, by distillation prior to the introduction of the carbon disulphide. While the contents of the reaction vessel are agitated, the carbon disulphide per se in the gaseous or liquid state, or in solution in the alcohol to be reacted is admitted to the reaction vessel at a zone or zones below the surface of the liquid contained therein. The reaction is in most cases initiated on contact of the reactants, if not, the reaction mixture may be heated to the necessary temperature by any suitable means.

The reaction is, in general, exothermic and is accompanied by the liberation of heat. The heat liberated is, in most cases, sufficient to maintain the reaction mixture at the desired reaction temperature and to effect the vaporization of the water to be distilled from the system. The reaction vessel is provided with heating means which may be resorted to when necessary or desirable.

Ordinarily, a true minimum boiling azeotropic mixture of water and alcohol will not be directly distilled from the reaction system, since if the reaction is initiated under substantially anhydrous conditions, there will not be sufficient water present in the system to form the minimum boiling azeotropic composition with the alcohol vaporized. However, by employing an efficient fractionating apparatus, a true azeotropic mixture may be removed from the top of the column and the excess of alcohol condensed and conducted back to the reaction mixture. In some cases, particularly when sodium xanthates are prepared, it is possible for part or all of the water liberated in the course of the reaction to be combined with the xanthate, which may crystallize from the reaction mixture, as water of crystallization. In accordance with my invention, in cases where hydrated xanthates may be formed, the liberated water is removed from the reaction mixture at a rate prohibitive to the formation of the hydrated xanthate crystals, since the water vapor in equilibrium with the formed xanthate is below the minimum value necessary for hydration of the latter.

The temperature of operation should be sufficiently high so that the reaction of the carbon disulphide with the alcohol and alkali metal hydroxide or solution of alkali metal hydroxide in alcohol is very rapid. In general, temperatures in the range of from about 25° C. to 125° C. are suitable. The temperature in the reaction vessel will be dependent on the pressure in the reaction system. By operating at a constant predetermined pressure in the system, the temperature therein may be kept substantially constant within certain limits depending on the change in composition of the reaction mixture. It will be evident that my invention may be executed at subatmospheric, atmospheric or superatmospheric pressures, depending on the desired temperature of operation and on the vapor pressure relations of the water and organic hydroxy compound in the system. For example, if it is desired to operate at a temperature below that at which water may be removed from the system at atmospheric pressure, the pressure on the system is adjusted until the system is at the desired temperature and under a pressure at which water formed in the course of the reaction is distilled therefrom.

The carbon disulphide per se or its solution in the alcohol employed may be added intermittently, or continuously to the reaction vessel. In the majority of cases it is preferably continuously introduced at a rate depending on its rate of reaction with the alcohol and hydroxide, on the rate of the removal of the water formed and on the desired temperature and pressure of operation.

My invention may be executed with the reactants in the presence of a liquid organic compound which is chemically inert to the reactants. Suitable organic liquids which may be employed for this purpose include hydrocarbons or mixtures thereof such as benzene, toluene, kerosene, gasoline, etc. Organic ethers, esters and the like compounds may also be employed. The use of such compounds may be advantageous in that the temperature and pressure in the reaction system may be more efficiently regulated and, in addition, water formed during the reaction may, in some instances, be more rapidly and effectively removed from the reaction mixture. The inert component of the reaction mixture may form a minimum boiling azeotropic or constant boiling mixture including the water and alcohol or it may simply form a constant boiling mixture with water.

The constant boiling mixture distilled from the reaction system may be condensed and its constituents separated. The alcohol and/or inert liquid constituent of the reaction mixture thus recovered may be dried and reutilized.

The following example is illustrative of a preferred mode of execution of my invention. It is to be understood that this specific example is introduced for purposes of illustration, and that I do not thereby limit my invention.

Example

A solution of commercial anhydrous secondary butyl alcohol saturated with potassium hydroxide at the boiling point of the solution contains 13% by weight KOH. Such a solution is placed in an insulated vessel, supplied with a source of heat such as steam coils, and is attached to a condenser supplied with a cooling medium and ending in a receiving vessel. The latter is attached to a vacuum pump. The pressure in the system is reduced to approximately 110 mm. and heat supplied until the alcoholic solution in the container just boils and alcohol very slowly drips from the end of the condenser. The supply of heat is now discontinued and carbon disulphide, diluted with its own weight of alcohol, is slowly introduced by means of a tube discharging well under the surface of the liquid. The introduction of the carbon disulphide is so regulated that the heat of reaction causes vigorous boiling and active distillation of alcohol and water. The addition of carbon disulphide is continued until 1 mol of carbon disulphide (plus slight excess) has been added for every mol of potassium hydroxide originally present in the alcohol. In case boiling is not sufficiently vigorous to insure rapid removal of water, heat may be supplied to the contents of the vessel. Secondary butyl xanthate of high purity and nearly theoretical yield is thus produced—largely in suspension in the excess alcohol, but to some extent in solution. The solid xanthate is separated from the alcohol, washed with pure alcohol, and dried.

It will be obvious to those skilled in the art that the excess alcohol may be used in further operation. In the case of that collected in the cold receiver, water should be removed by any of the well-known means.

It will be apparent that my process is adaptable to a batch, intermittent or continuous mode of operation. The reactants may be continuously introduced into the reaction vessel in stoichiometrical proportions; the alcohol being in the reaction chamber in an amount in excess of that consumed in the reaction and possibly removed with the water. The xanthate formed may or may not exist as a solid in the reaction vessel. In general, when an amount of carbon disulphide in slight molecular excess of the initially introduced caustic has been reacted, the reaction mixture comprises a solution and/or suspension of the xanthate in the excess of alcohol present. If the xanthate formed is relatively soluble in the excess of alcohol, the resulting solution may or may not be saturated depending on the relative magnitude of the excess of alcohol initially employed or introduced during the reaction as compared with the amount removed with the water.

In a batch or intermittent mode of operation, the contents of the reaction vessel are cooled and discharged therefrom when substantially all of the basic compound and carbon disulphide have been reacted. The reaction product may be recovered from the reaction mixture in any desirable manner. For example, if solid xanthate is present it may be separated by filtration, centrifugation and like means. The dissolved xanthate may be recovered from its solution in alcohol by distilling off the alcohol at an atmospheric or subatmospheric pressure, or by resorting to the use of any of the well-known crystallizing methods. The alcohol recovered may be reutilized in the same or another reaction vessel.

When operating in a continuous manner, the partially or completely reacted reaction mixture may be continuously withdrawn from the reaction stage or stages and conducted to a communicating separation stage or stages wherein the xanthate in solution and/or suspension may be separated and the unreacted reactants or other constituents conducted back to a communicating reaction stage or stages.

It is to be understood that I do not intend to limit my invention to any specific apparatus, mode of operation or order of introduction of the reactants. In some instances, it may be desirable to introduce a preferably anhydrous solution or suspension of the alkali metal hydroxide in the organic hydroxy compound into an excess of the carbon disulphide contained in the reaction vessel at such a temperature and pressure that water and carbon disulphide are distilled therefrom in accordance with their vapor pressure relations.

My invention is widely applicable to any of the known methods of preparing metal salts of xanthic acid. The application of the principles of the present invention to these modes of procedure, in general, results in satisfactory yields of anhydrous metal xanthates substantially devoid of metal thiocarbonates and sulphides and the like undesirable impurities. It is particularly useful as applied to a process for the large scale production of sodium and potassium xanthates of the monohydric alcohols as ethyl, propyl, isopropyl, primary and secondary butyl, isobutyl, amyl, isoamyl furfuryl and the like. These sodium and potassium xanthates, as well as others readily prepared by my method, have a wide variety of use in froth flotation processes as promoters, for insecticides and as vulcanizing accelerators.

I claim as my invention:

1. The method of preparing a salt of a xanthic acid which comprises reacting an alcohol with carbon disulphide and an alkali metal hydroxide at a temperature and pressure at which water is distilled from the reaction mixture.

2. The method of preparing a salt of a xanthic acid which comprises reacting an excess of an alcohol with carbon disulphide and an alkali metal hydroxide at a temperature and pressure at which water formed during the course of the reaction is distilled from the reaction mixture as a minimum constant boiling mixture with at least part of said excess of the organic hydroxy compound.

3. The method of preparing a salt of a xanthic acid which comprises reacting an aliphatic alcohol with carbon disulphide and an alkali metal hydroxide at a temperature and pressure at which water is distilled from the reaction mixture.

4. The method of preparing a salt of a xanthic acid which comprises reacting an aliphatic monohydric alcohol with carbon disulphide and an alkali metal hydroxide at a temperature and pressure at which water is distilled from the reaction mixture.

5. The method of preparing a salt of a xanthic acid which comprises reacting an unsaturated alcohol with carbon disulphide and an alkali metal hydroxide at a temperature and pressure at which water is distilled from the reaction mixture.

6. The method of preparing a salt of a xanthic acid which comprises reacting an aliphatic monohydric secondary alcohol with carbon disulphide and an alkali metal hydroxide at a temperature and pressure at which water is distilled from the reaction mixture.

7. The method of preparing a salt of a xanthic acid which comprises reacting an alcohol with carbon disulphide and an alkali metal hydroxide in the presence of an inert organic compound at a temperature and pressure at which water is distilled from the reaction mixture as a minimum ternary constant boiling mixture with at least part of said excess of the organic hydroxy compound and the inert component.

8. The method of preparing a salt of a xanthic acid which comprises reacting an alcohol with carbon disulphide and an alkali metal hydroxide at a temperature and pressure at which the reaction proceeds rapidly and under a pressure at which water is distilled from the reaction mixture.

9. The method of preparing a salt of a xanthic acid which comprises passing carbon disulphide into a reaction vessel containing an alkali metal hydroxide and an excess of an alcohol at such a temperature and pressure that water is distilled from the reaction mixture.

10. The method of preparing a salt of a xanthic acid which comprises passing a solution of carbon disulphide in an alcohol into an alcoholic solution of an alkali metal hydroxide contained in a reaction vessel equipped with a fractionating column, the system being at such a temperature and pressure that water is fractionated therefrom.

11. The method of preparing a salt of a xanthic acid which comprises reacting an alcoholic solution of an alkali metal hydroxide with carbon disulphide at such a temperature and pressure that water is distilled from the reaction mixture.

12. The method of preparing a salt of a xanthic acid which comprises reacting carbon disulphide with a solution of an alkali metal hydroxide in secondary butyl alcohol at a temperature and pressure at which water is distilled from the reaction mixture.

13. The method of preparing a salt of a xanthic acid which comprises reacting an alcohol containing at least one primary carbinol group with carbon disulphide and an alkali metal hydroxide at a temperature and pressure at which water is distilled from the reaction mixture.

14. The method of preparing a salt of a xanthic acid which comprises reacting a monohydric primary alcohol with carbon disulphide and an alkali metal hydroxide at a temperature and pressure at which water is distilled from the reaction mixture.

LUDWIG ROSENSTEIN.